United States Patent [19]

Tateishi

[11] Patent Number: 5,155,417
[45] Date of Patent: Oct. 13, 1992

[54] S-SHAPED CORRECTION CAPACITOR SWITCHING DEVICE FOR AUTOMATIC TRACKING MONITOR

[75] Inventor: Masaru Tateishi, Nagasaki, Japan

[73] Assignee: Mitsubishi Denki Kabushiki Kaisha, Tokyo, Japan

[21] Appl. No.: 645,606

[22] Filed: Jan. 25, 1991

[30] Foreign Application Priority Data

May 28, 1990 [JP] Japan .................. 2-137473

[51] Int. Cl.⁵ .............. G09G 1/00; H01J 29/70
[52] U.S. Cl. .................... 315/371; 315/408
[58] Field of Search ................ 315/371, 408

[56] References Cited

U.S. PATENT DOCUMENTS

| 4,501,995 | 2/1985 | Olmstead et al. | 315/371 |
| 4,705,993 | 11/1987 | Kashiwagi | 315/408 |
| 4,761,586 | 8/1988 | Wharton | 315/408 |
| 4,789,811 | 12/1988 | Hulshof | 315/371 |

FOREIGN PATENT DOCUMENTS 0199542 10/1986 European Pat. Off. .
61-230576 10/1986 Japan .
62-43269 2/1987 Japan .
1-268356 10/1989 Japan .
2140640 11/1984 United Kingdom .

OTHER PUBLICATIONS

N. Matsuo et al., "A 14" Digital-Scan Colour-Display Monitor, *MITSUBISHI ELECTRIC ADVANCE*, vol. 42, Mar. 1988, pp. 18–21.

*Primary Examiner*—Gregory C. Issing
*Attorney, Agent, or Firm*—Burns, Doane, Swecker & Mathis

[57] ABSTRACT

An S-shaped correction capacitor switching devices are applied to automatic tracking monitors. An automatic tracking monitor is a monitor display device which can cope with various horizontal frequencies to be capable of being connected to various types of personal computers. The control means judges the frequency of a horizontal synchronizing signal of a device being handled, and based on the result of the judgment it decides the combination of capacitors to be connected to a deflection coil. Furthermore, it adjusts the combination of capacitors corresponding to adjustment data, thereby the distortion on an image caused by the dispersion of capacitance values among individual capacitors can be prevented.

2 Claims, 4 Drawing Sheets

2a~2e : S-SHAPED CORRECTION CAPACITORS
3a~3e : SWITCHES

S-SHAPED CORRECTION CAPACITOR SWITCHING DEVICE FOR AUTOMATIC TRACKING MONITOR

BACKGROUND OF THE INVENTION

1. Field of the Invention

The present invention relates to an S-shaped correction capacitor switching device for an automatic tracking monitor for switching the S-shaped correction capacitors to be connected to a deflection coil of an automatic tracking monitor based on the frequency of a horizontal synchronizing signal. The automatic tracking monitor is a monitor display device which can be used for personal computers of various types being connected to them and is able to cope with various horizontal frequencies.

2. Description of the Prior Art

FIG. 1 is a block diagram showing a conventional S-shaped correction capacitor switching device for an automatic tracking monitor. In the figure: 1 is a deflection coil of an automatic tracking monitor; 2a to 2c are S-shaped correction capacitors to be selectively connected to the deflection coil 1; 3a to 3c are respectively provided corresponding to the S-shaped correction capacitors 2a to 2c and they are switches for setting the connection between the deflection coil 1 and each of these S-shaped correction capacitors; 4 is an analog switch which selects a capacitor out of the S-shaped correction capacitors 2a to 2c to be connected to the deflection coil 1 according to the frequency of a horizontal synchronizing signal and makes one of the switches 3a to 3c ON which corresponds to the selected one out of the S-shaped correction capacitors 2a to 2c.

Next, the explanation on the operation will be given. For the analog switch 4 specified changeover frequencies X and Y ($0<X<Y$) are set beforehand and when a horizontal synchronizing signal is input, the frequency is compared with these switching frequencies X and Y. In the result, when the frequency of a horizontal synchronizing signal is lower than the switching frequency X, the switch 3a is made ON; when the frequency of a horizontal synchronizing signal is equal to or higher than the switching signal frequency X and lower than Y, the switch 3b is made ON; and when the frequency of a synchronizing signal is equal to or higher than the switching signal frequency Y, the switch 3c is made ON. By this arrangement an optimum capacitor corresponding to the frequency of a horizontal synchronizing signal is selected out of the S-shaped correction capacitors 2a to 2c, and thus the optimum S-shaped correction capacitor is connected to the deflection coil 1.

In this case, for switching frequencies X and Y of the analog switch 4, the frequencies which are not used for any horizontal synchronizing frequency in personal computers are selected and set after survey of horizontal synchronizing frequencies of various personal computers. The capacitance of each of these S-shaped correction capacitors 2a to 2c is decided based on the frequency of a horizontal synchronizing signal which is adopted by the most kinds of personal computers in the corresponding frequency range, that is, in each frequency range, a frequency lower than the switching frequency X, a frequency equal to or higher than X and lower than Y, and a frequency equal to or higher than Y.

The conventional S-shaped correction capacitor switching device for an automatic tracking monitor is constituted as described above, so that in frequency ranges sectioned by the switching frequencies set in the analog switch 4, the capacitances of the S-shaped correction capacitors 2a to 2c are decided corresponding to horizontal synchronizing frequencies adopted by the most kinds of devices; when a personal computer is connected to the monitor having such a switching device, the personal computer having a horizontal synchronizing frequency which does not coincide with one of the frequencies decided in the above-mentioned frequency ranges, there remains some distortion in an image on the monitor; furthermore there is a problem that a slight distortion in the image caused by the dispersion of capacity values among the S-shaped correction capacitors, 2a to 2c, can not be removed.

SUMMARY OF THE INVENTION

The present invention is invented to solve the above-mentioned problems, and the object of the invention is to obtain an S-shaped correction capacitor switching device for an automatic tracking monitor in which fine adjustment of the setting of switching frequencies is possible and the adjustment for the dispersion of capacitance values is also possible.

The S-shaped correction capacitor switching device for an automatic tracking monitor according to the present invention comprises: a control means for deciding the combination of S-shaped correction capacitors to be connected to a deflection coil based on the frequency of a horizontal synchronizing signal, further for adjusting the combination of the S-shaped correction capacitors according to adjustment data, and finally for activating the switches corresponding to finally selected S-shaped correction capacitors; and an input means for inputting the above-mentioned adjustment data.

Since the control means in the present invention has functions of selecting the combination of S-shaped correction capacitors to be connected to a deflection coil based on the frequency of a horizontal synchronizing signal, adjusting the combination according to the adjustment data input from an input means and connecting the individual S-shaped correction capacitors in the finally decided combination to the deflection coil by activating the switches corresponding to respective capacitors, the control means realizes an S-shaped correction capacitor switching device in which the capacitance of capacitors to be connected to the deflection coil can be fine-adjusted and further the adjustment for the dispersion of capacitance values is also possible.

DETAILED DESCRIPTION OF THE PREFERRED EMBODIMENTS

Figure 2:
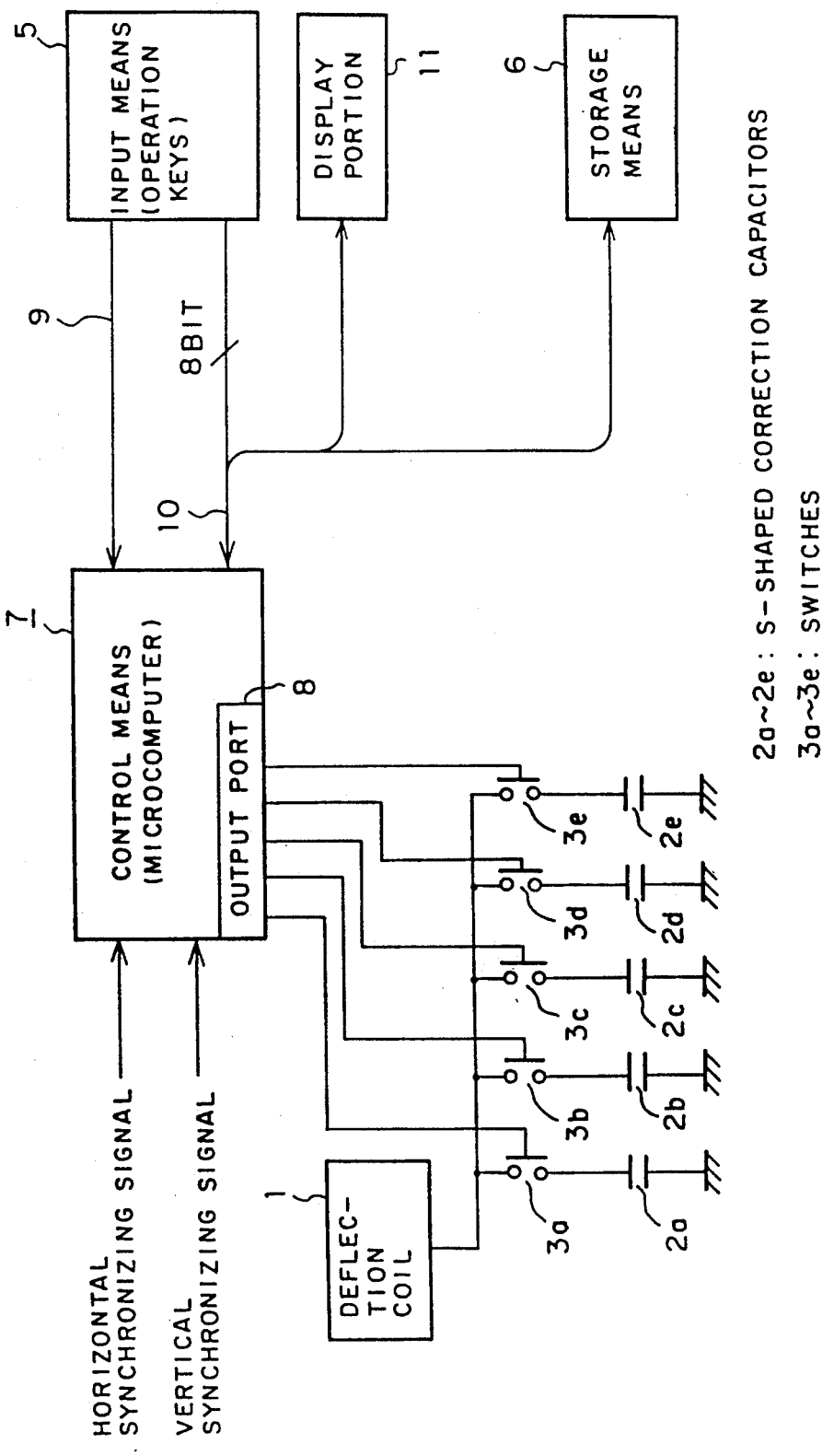
FIG. 2 is a block diagram showing an S-shaped correction capacitor switching device for an automatic tracking monitor in an embodiment according to the present invention.

An embodiment according to the present invention will be explained referring to the drawings in the following. The following is the description concerning FIG. 2: 1 is a deflection coil, 2a to 2e are S-shaped correction capacitors similar to the capacitors 2a to 2c in FIG. 1, and 3a to 3e are switches which set the connection of S-shaped correction capacitors 2a to 2e to the deflection coil 1 similar to 3a to 3c in FIG. 1.

A part 5 is an input means comprising operation keys to which adjustment data are input to be used by users for adjusting the connections of S-shaped correction capacitors 2a to 2e to the deflection coil 1. The operation keys comprise, for example, a capacitance adjustment key, an UP key and a DOWN key. A part 6 is a storage means for storing the adjustment data, for example, it is constituted with a read-only memory which is electrically erasable and programable.

A part 7 is a microcomputer which works as a control means as described below; it selects the combination of S-shaped correction capacitors 2a to 2e to be connected to the deflection coil 1 based on the frequency of a horizontal synchronizing signal and makes adjustment of the capacitance according to the adjustment signal; it makes the switches 3a to 3e ON corresponding to S-shaped correction capacitors 2a to 2e included in a decided combination of capacitors; and 8 is the output port of it.

A part 9 is an interruption control line which transmits an interruption signal generated by the operation keys 5 to the microcomputer 7; 10 is a bus of the microcomputer 7; and 11 is a display portion which shows an operation state.

Figure 3:
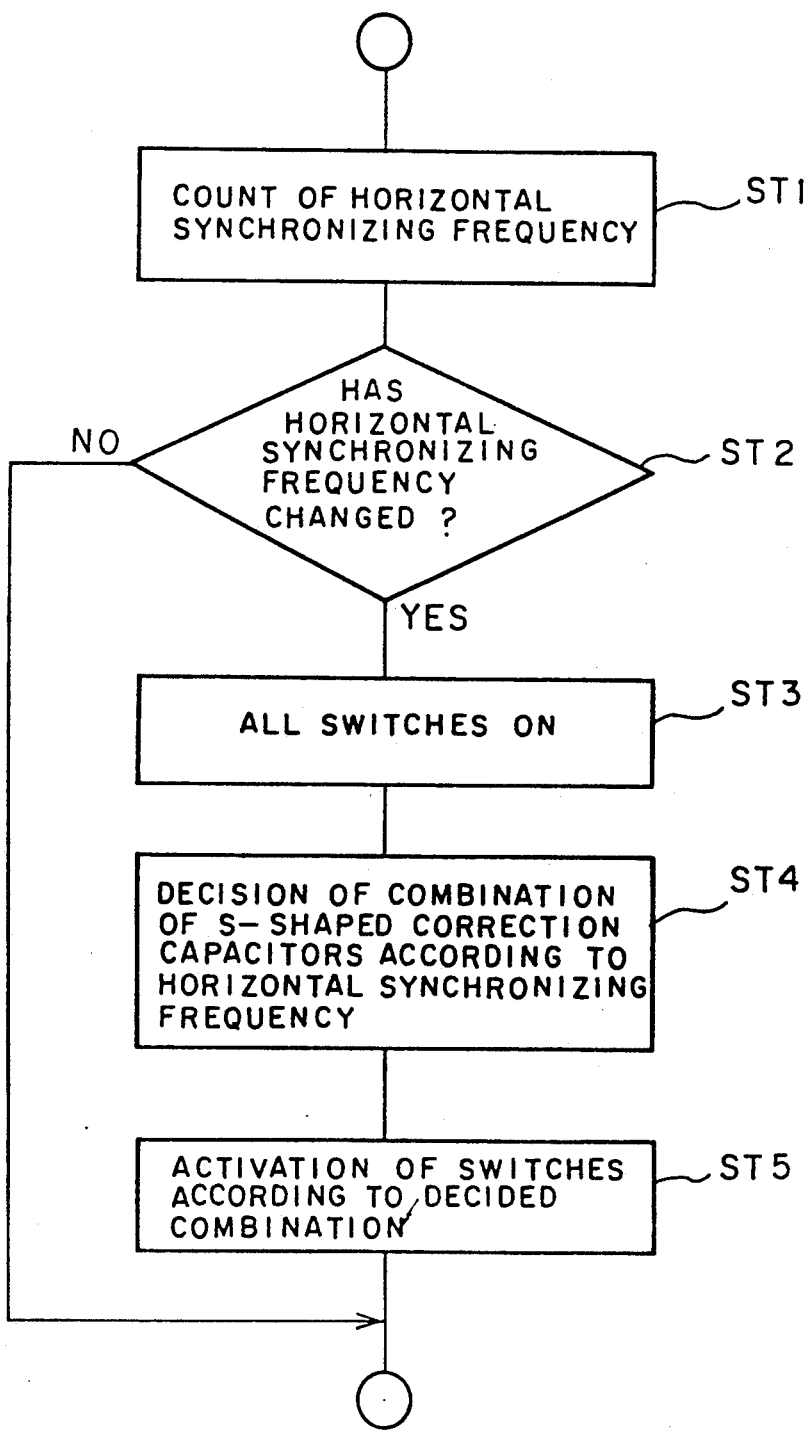
FIG. 3 is a flow chart showing the procedure for a switching process of S-shaped correction capacitors when the frequency of a horizontal synchronizing signal is changing.

Next, operation will be explained. FIG. 3 is a flow chart showing the procedure of a switching process of S-shaped correction capacitors when the frequency of a horizontal synchronizing signal is changing. It is assumed that the capacitance of each of these S-shaped correction capacitors 2a to 2e is set, for example, to increase at a geometric ratio of 2, that is, the capacitance of 2a is "C", that of 2b is "2×C", - - -, that of 2e is "16×C". Therefore, 32 kinds of capacitance values, "0" to "31×C" at intervals of "C", can be selected for the connection to the deflection coil 1 according to the combinations of switches 3a to 3e. The microcomputer 7 has a program designating how much capacitance is to be selected for the frequency of an input horizontal synchronizing signal, that is, the microcomputer 7 keeps the data shown with a full line in FIG. 4 (the data at no adjustment).

When a horizontal synchronizing signal is input, the microcomputer 7, at first, performs the counting of the horizontal synchronizing frequency (step ST1), and further it judges if the horizontal synchronizing frequency has changed (step ST2). For the judgment of the change in the horizontal synchronizing frequency, for example, a method can be adopted in which the number of input horizontal synchronizing signal pulses is counted for 8 periods of the vertical synchronizing signal and the counted values in respective periods are averaged. When the difference between the mean value and the value which has been measured previously is less than ±2, the horizontal synchronizing frequency is regarded to have not changed. Thus the influence of a count error is avoided.

If there is no change in the horizontal synchronizing frequency, the microcomputer 7 finishes the process as scheduled.

If there is any change in the horizontal synchronizing frequency, the microcomputer 7 controls switches 3a to 3e to make all of them ON for once (step ST3) through its output port 8. In this way, the protection of hardware is considered by making all switches 3a to 3e ON for once before the switching of S-shaped correction capacitors 2a to 2e.

Next, the microcomputer 7 selects a proper capacitance value out of the above-mentioned 32 kinds of capacitance values based on a new horizontal synchronizing frequency and decides the combination of S-shaped correction capacitors 2a to 2e to be able to obtain the proper capacitance value (step ST4). After that, the microcomputer 7 controls the switches 3a to 3e through the output port 8 to be activated only the switches, selected out of those which are all made ON for once in step ST3, which correspond to S-shaped correction capacitors 2a to 2e included in the combination decided in step ST4 (step ST5); thus the process is completed.

Figure 4:
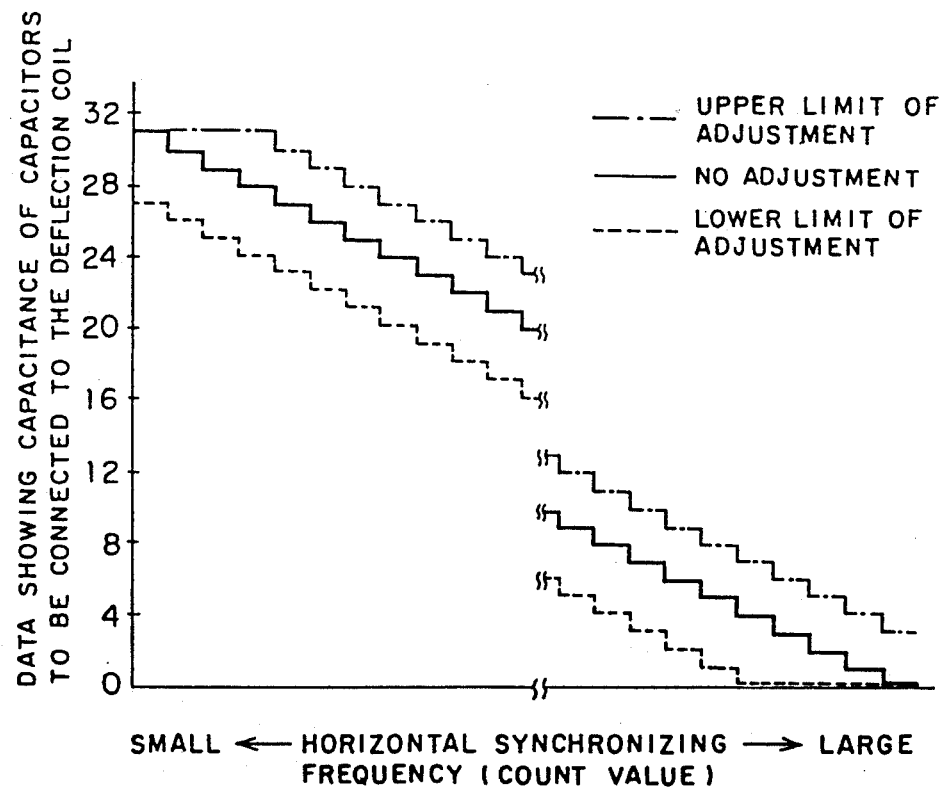
FIG. 4 is an illustrative representation showing the relation between the capacitance of capacitors to be connected to the deflection coil and a horizontal synchronizing frequency.
Figure 1:
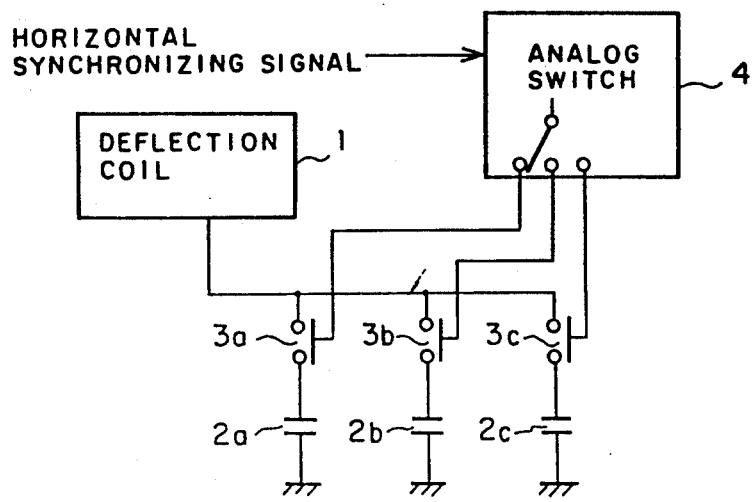
FIG. 1 is a block diagram showing a conventional S-shaped correction capacitor switching device for an automatic tracking monitor.

When there is slight image distortion caused by the dispersion of capacitance of capacitors, further adjustment of the capacitors connected to the deflection coil 1 is possible by the control of the microcomputer 7. In that case, the current is prevented from flowing too much by providing a specified adjustment range as shown in FIG. 4 for the protection of hardware. In the figure, a polygonal full line shows unadjusted capacitance value which is adapted to the process shown in the flow chart in FIG. 3, a polygonal one dot chain line shows the upper limit value in the above-mentioned adjustment, and a polygonal broken line shows the lower limit value in the adjustment. In this case, the upper limit value is equal to the unadjusted value to which 3 is added, and the lower limit value is equal to the unadjusted value from which 4 is subtracted.

Figure 5:
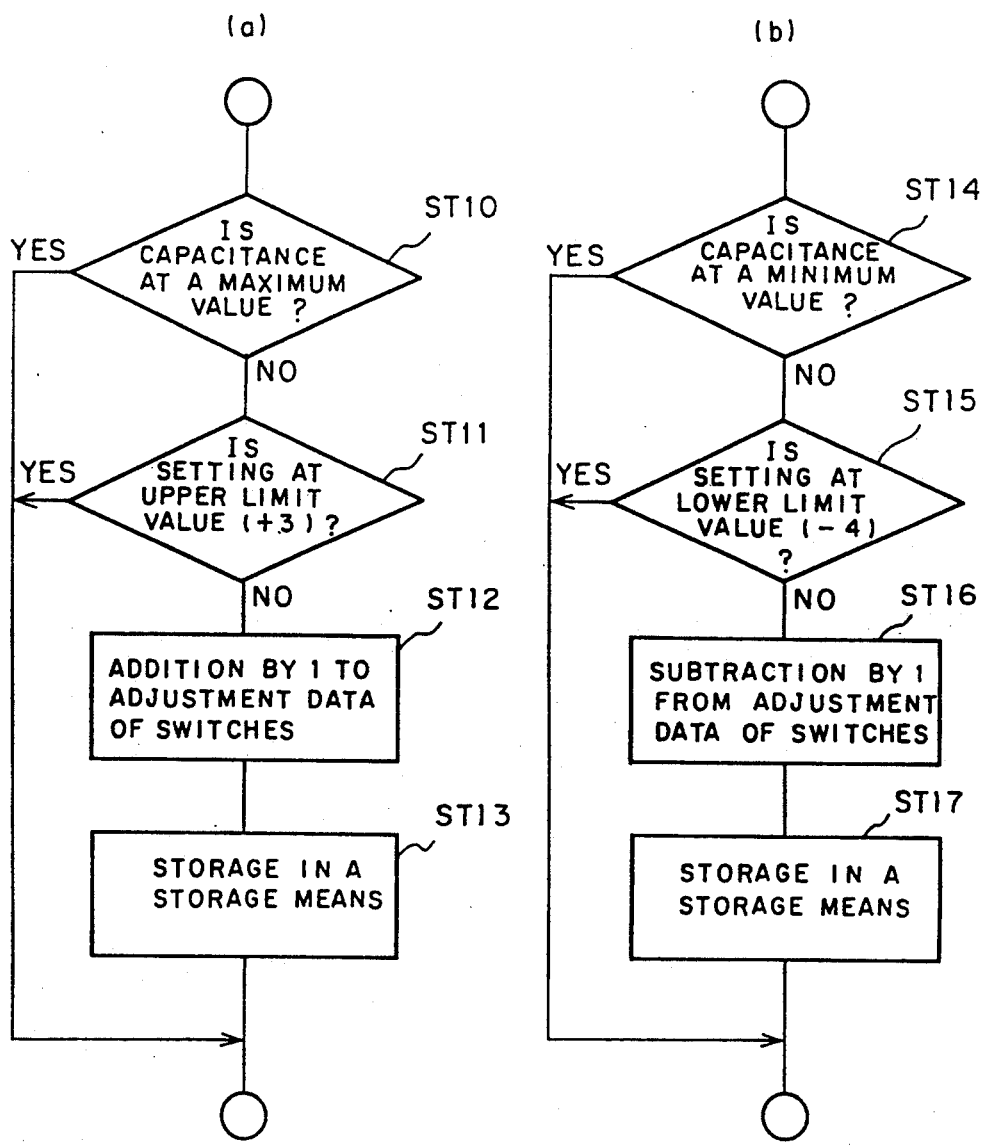
FIG. 5 is a flow chart showing the adjustment process procedure of the capacitance of capacitors to be connected to the deflection coil.

FIG. 5 is a flow chart showing the procedure for an adjustment process of capacitance of capacitors to be connected to the deflection coil 1; in FIG. 5(a) is shown a process procedure when capacitance is to be increased; and in FIG. 5(b) is shown a process procedure when capacitance is to be decreased.

When it is necessary for users to adjust the capacitance of capacitors connected to the deflection coil 1, they can perform a specified key operation on the operation keys 5. For example, assume that a capacitance adjustment key of the operation keys 5 is depressed; by this operation an interruption signal is sent out from the operation keys 5 to an interruption control line 9 and an adjustment request signal of the capacitance of capacitors to be connected to the deflection coil 1 is output to a bus 10. The microcomputer 7 which is started to perform an interruption process by the interruption signal recognizes the request of an adjustment process of the capacitance of capacitors to be connected to the deflection coil 1 in observing the bus 10. The microcomputer 7 gives a display in a display portion 11 that the request is accepted. When users perform key operation on the operation keys 5 for increasing or decreasing the capacitance of capacitors to be connected to the deflection coil 1, an interruption signal is similarly generated in the operation keys 5, and the microcomputer 7 is started to perform an adjustment process of the capacitance of capacitors to be connected to the deflection coil 1 based on the interruption signal.

When the request is to increase the capacitance, that is, when an UP key is depressed, it is judged if the capacitance is at the maximum value in step ST10, if it is at the maximum value the process is terminated as it is. If it is not at the maximum value, it is judged if the adjustment is performed up to the upper limit value (within the unadjusted value +3); if the value is set at the upper limit value the process is terminated as it is. When the capacitance value is within the upper limit value, the adjustment data for switches 3a to 3e stored in a storage means 6 are changed to the data to increase the capacitance of capacitors to be connected to the deflection coil 1 by "C" in step ST12. At this time, the microcomputer 7 can give a display in the display portion 11 that the adjustment data are accepted.

The microcomputer 7 controls the switches 3a to 3e through its output port 8 based on the adjustment data so that the specified combination of S-shaped correction capacitors 2a to 2e can be connected to the deflection coil 1. In other words, the switches 3a to 3e are controlled so that the capacitors having the capacitance which is equal to the unadjusted value added with the adjustment value specified by the adjustment data can be connected to the deflection coil 1. In step ST13, the microcomputer 7 sends the revised data to the storage means 6 through the bus 10 and stores them in an area corresponding to the horizontal synchronizing frequency. By this arrangement, the setting of an optimum capacitance for the deflection coil 1 can be sustained.

If the request of a user is to decrease the capacitance, that is, when the DOWN key is depressed, it is judged if the capacitance is at a minimum value in step ST14, and further it is judged if the capacitance is adjusted down to a lower limit value (within the unadjusted value −4) in step ST15. After that, the adjustment data for switches 3a to 3e are revised in step ST16, and the revised adjustment data are stored in the corresponding area of the storage means 6 in step ST17.

As described in the above, the capacitance values of the S-shaped correction capacitors 2a to 2e are set to increase in a geometrical ratio of 2; therefore, the capacitance of capacitors to be connected to the deflection coil 1 is proportional to the data showing capacitance managed by the microcomputer 7, and the revision of adjustment data in steps ST12 and ST16 can be performed by simply adding 1 or subtracting 1.

According to the present invention, since an S-shaped correction capacitor switching device for an automatic tracking monitor is constituted so that it has such functions as described below: the combination of S-shaped correction capacitors to be connected to the deflection coil 1 is decided based on the frequency of a horizontal synchronizing signal and an adjustment signal input from the input means; the S-shaped correction capacitors are connected to the deflection coil 1 by activating the switches corresponding to respective capacitors, the capacitance of capacitors to be connected to the deflection coil can be set in fine steps, the adjustment for the dispersion of capacitance values is possible, and the protection of hardware is also possible.

What is claimed is:

1. An S-shaped correction capacitor switching device for an automatic tracking monitor, said S-shaped correction capacitor switching device comprising:

a deflection coil and a plurality of switches disposed between a plurality of respective S-shaped correction capacitors to be selectively connected to said deflection coil;

manual input means for manually inputting adjustment data used to adjust the connections of said S-shaped correction capacitors to said deflection coil, wherein the manual input means comprises operation keys operable by users, the operation keys comprising a capacitance adjustment key for causing the microcomputer to input the adjustment data, an UP key for inputting adjustment data for increasing capacitance, and a DOWN key for inputting adjustment data for decreasing capacitance;

a storage means for storing adjustment data input to an input means; and a control means for deciding the combination of said S-shaped correction capacitors to be connected to said deflection coil based on the frequency of a horizontal synchronizing signal, for adjusting the combination of said S-shaped correction capacitors corresponding to said adjustment data, and for activating said switches corresponding to the combination of the S-shaped correction capacitors after adjustment, wherein said control means comprises a microcomputer having a program for deciding the capacitance of S-shaped correction capacitors corresponding to the frequency of an input horizontal synchronizing signal and for adjusting said capacitance corresponding to the adjustment data stored in said storage means, and having an output port to which said plurality of switches are connected.

2. The device of claim 1, wherein said correction capacitors have respective capacitances that increase at a geometric ratio of two.

* * * * *